3,487,105
α-AMINOACYL-ω-AMINOCARBOXYLIC ACIDS
Norman H. Grant, Wynnewood, Harvey E. Alburn, West Chester, and Donald E. Clark, Norristown, Pa., assignors to American Home Products Corporation, New York, N.Y., a corporation of Delaware
No Drawing. Filed Dec. 16, 1966, Ser. No. 603,708
Int. Cl. C07c 101/02; A61k 27/00
U.S. Cl. 260—514         3 Claims This invention relates generally to novel chemical compounds having valuable pharmacodynamic properties, to processes for preparing said compounds, and to a method of blocking auto-immune processes in warm-blooded animals with the use of said compounds.

The novel compounds of the invention are the α-aminoacyl-ω-aminocarboxylic acids encompassed within the following general formula:

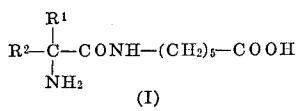

wherein $R^1$ and $R^2$, when separate, are hydrogen and benzyl, respectively, and, when joined, complete an alicyclic ring which is cyclopentane.

The novel compounds of Formula I may conveniently be prepared by heat-reacting a selected anhydride with 6-aminohexanoic acid in accordance with the following reaction scheme:

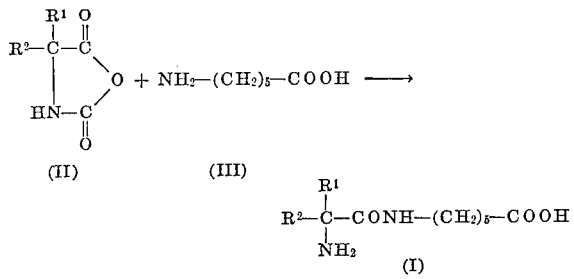

wherein $R^1$ and $R^2$ have the same meanings described hereinbefore.

The reactant (III), 6-aminohexanoic acid, employed in the preparative process illustrated by the above reaction scheme is a known compound which is readily available from commercial sources. The reactants (II), which are not commercially available, can easily be prepared in accordance with standard organic procedures well known to those skilled in the art. For example, a procedure which has been employed to synthesize the anhydrides of Formula II above utilized in the preparation of the compounds (I) of the present invention is described in U.S. Patent 3,206,455, "Process for Producing 6-(α-Aminoacylamino)-Penicillanic Acids," H. E. Alburn and N. H. Grant.

It has been discovered that compounds of Formula I meeting the described qualifications have valuable pharmacological properties. More specifically, said compounds have been found to have unexpected anti-immune activity, as referred to in greater detail hereinafter.

The immune response, i.e., production of antibodies, is the means by which immunity to infectious disease is generated, and is an expression of the animal body's biochemical integrity. Malfunctions of this natural defense mechanism are known collectively as the immunopathies. These are characterized by altered response to external antigens, i.e., the manifestation of atopy or an allergy. They also includes the auto-immune phenomena. The body is normally tolerant to its own tissues and does not treat them as antigens (foreign substances). A breakdown of this tolerance (natural homoestatic mechanisms) is the basis of those pathologic entities grouped under the term, auto-immune diseases. In addition to the immunopathies, normal functioning of the immune system can be disadvantageous, for example, by causing rejection of transplanted tissues or organs. Obviously, suppression of the immune response can be of major therapeutic importance in particular instances.

Suppression of the immune response was initially observed after X-ray and cortisone treatment, and can now be achieved by certain of the agents initially developed for use in cancer chemotherapy. In addition to the corticosteroids, these compounds can be divided into three major classifications; the alkylating agents (nitrogen mustards), purine antimetabolites (6-mercaptopurine) and the folic acid antagonists (methotrexate). Remarkable success in the treatment of nonneoplastic (auto-immune) diseases, and prolongation of homografts with these antineoplastic agents has stimulated research into this area of increasing interest and practical importance. Specific auto-immune diseases treated with antimetabolites include systemic lupus erythematosus, thyroiditis, polyradiculoneuropathy, forms of male sterility, immuno-allergic lung purpura, psoriasis, nephrosis, hepatitis, rheumatoid arthritis, auto-immune hemolytic anemia, idiopathic thrombocytopenic purpura, erythema nodosum, periarteritis nodosa, idiopathic plasmocytosis, atopic dermatitis, systemic scleroderma, sarcoidosis, amyloidosis, myasthenia gravis, multiple sclerosis and other demyelinating diseases of the central nervous system, including diffuse scleroderma, heart disease, Sjorgren's syndrome, ulcerative colitis, sympathetic ophthalmia, uveitis, Addison's disease, pernicious anemia, polymyositis and dermatomyositis. Additionally, reports of auto-immune phenomena have been found associated with leprosy, tuberculosis and other infectious diseases. As a practical goal in the treatment of these immunologic diseases, and in prolonging homograft survival; the possibility of selectively suppressing the immune response of an adult animal to a specific antigen is clearly of major importance.

Unfortunately, of the heretofore known groups of compounds referred to above as having the desirable anitimmune activity; the alkylating agents are known to be carcinogenic and mutagenic, while the purine analogues are potentially so since they are incorporated into DNA. Further, the toxicity of the folic acid antagonists and corticosteroids are well known. Thus, from the method of treatment aspect of the present invention, such invention, in its broadest concept, also resides in the method of blocking an auto-immune process in a warm-blooded animal by administering to said animal, in which said auto-immune process is undesirable, a therapeutically active amount of a compound selected from the group consisting of those having the general Formula I as defined hereinbefore.

It has been well established that agents which are effective in human auto-immune diseases are active also in preventing both the clinical and histopathologic changes which occur when test animals are challenged intravenously or orally with pretreated sheep red cells, as referred to in greater detail hereinafter. Such agents include the compounds of thioguanine, Imuran, 6-mercaptopurine, cyclophosphamide, methotrexate and cortisone, all of which have been shown to be active in human immunopathies. Thus, the aforesaid challenge of test animals dosed with a specific compound may serve as a test standard for activity of other compounds with respect to the suppression of auto-immune processes in general. (cf., H. C. Nathan et al., "Detection of Agents Which Interfere with the Immune Response"; Soc. Expt. Biol. and Med., 107 (1961).

In accordance with the test described in the Nathan et al. article identified above, preliminary preparations therefor are as follows: Male albino mice, having a body weight of 18–20 gms. are selected as the test animals. The test standard compound is 6-mercaptopurine; and the vehicle for both the test standard compound and the compounds to be tested for the anti-immune activity, comprises a 0.5 percent solution of carboxymethyl cellulose (CMC) in distilled water (USP). The challenging material (i.e., the antigen) used in the test is prepared by (a) exposing sterile, washed sheep cells for 10 min. at 37° C. to an equal volume of 1:10,000 tannic acid in buffered saline solution, (b) collecting the treated cells by centrifugation; (c) washing the cells with similar buffered saline; (d) then resuspending the cells in the aforesaid 0.5 percent solution of CMC in distilled water. The buffered saline is preferably comprised of saline (0.85 percent NaCl) mixed with an equal volume of buffer (29.9 ml. M/15 $KH_2PO_4$+75.0 ml. M/15 $Na_2HPO_4$).

In the actual procedure of the Nathan et al. test, the test animals are initially challenged intravenously with 0.25 ml. of a 30 percent buffered suspension of sheep red cells which have been pretreated as described hereinbefore. Treatment of the test animals with the selected test agent and the reference standard, 6-mercaptopurine, is initiated immediately after injection of the aforesaid antigen. Appropriate untreated antigen control animals are included. At selected intervals of time, the mice are bled from the heart, the serum separated and pooled for each treatment group and the hemagglutinin titer determined by serial 2-fold dilutions in test tubes as described by A. B. Stavitsky, J. Immunol. 72, 360 (1964) and/or by the known microtiter method employing cup plate assemblies. The hemogglutinin is the host's antibody to the antigen, sheep red cells.

The activity of the compounds tested with respect to suppression of the auto-immune response is determined as follows;

The score for each tube is multiplied by the appropriate exponent of the 2-fold dilution series, and the values summed for each series. The index of drug effect for the compound under test is obtained as a ratio of these sums for the treated to the untreated control, as set forth in the aforesaid Nathan et al. article, wherein the antibody index (A.I.) is determined in accordance with the following formula:

$$A.I. = \frac{\sum (S_1 + 2S_2 + 3S_3 + \cdots nS_n)_T}{\sum (S_1 + 2S_2 + 3S_3 + \cdots nS_n)_S}$$

wherein

T=treated series
C=control series
n=the exponent of dilution (tube number in the 2-fold series); and
S=the agglutination score.

It is also now well known that agents which are effective in human auto-immune diseases are active also in preventing both the clinical and histopathologic changes which occur in experimental allergic encephalomyelitis (EAE). Such agents include the compounds thioguanine, Imuran, 6-mercaptopurine, cyclophosphamide, methotrexate and cortisone, all of which have been shown to be active in human immunopathies. Thus, the disease EAE may serve as a test standard, not only for some demyelinating diseases, more notably multiple sclerosis, but for auto-immune processes in general. (cf., N. W. Brandriss, J. W. Smith, R. N. Friedman, "Suppression of Allergic Encephalomyelitis by Antimetabolites"; Ann. N.Y. Acad. Sci., 122: 356, 1965).

EAE is characterized by a delayed (cellular) hypersensitivity which is tissue specific and results in clinical paralysis of the animal. Histopathological lesions of the spinal cord and brain caused by said disease resemble those in human demyelinating disease, and it is thus classified as an experimental auto-allergic or auto-immune disease. (cf., B. H. Waksman, "Experimental Allergic Encephalomyelitis and the 'auto-allergic' Diseases," I. Arch. Allerg. appl Immunol., 14 (suppl) 1, 1959; and I. R. Mackay and F. M. Burnet, "Auto-Immune Diseases, Pathogenesis, Chemistry and Therapy," Charles C. Thomas, Springfield, 1963).

The surprising efficacy of the compounds of Formula I above in both of the accepted tests described hereinbefore has clearly indicated that they are extremely active, relatively nontoxic, long-acting immuno-suppressive agents. On such basis, it has been found that, when compared to the standard compounds known to the art, said compounds of Formula I have been found to be effective both in the treatment of the chronic immunologic diseases mentioned previously, and in organ and tissue transplantation. Further, their long duration of action has indicated that only relatively low and infrequent dose schedules are required to obtain therapeutic effectiveness.

In the exercising of the method of the invention, the compounds of Formula I used therein may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects, and preferably at a level that is in the range of from about 5 mg. to about 300 mg. per kg. of body weight per day, although as aforementioned, variations will occur. However, a dosage level that is in the range of from about 10 mg. to about 100 mg. per kg. of body weight per day is most desirably employed in order to achieve effective results.

The following examples are illustrative of the preparation of the novel compounds useful in the method of invention and of the exercising of the latter, but are not to be considered necessarily limitative thereof.

EXAMPLE I 6-(1-aminocyclopentanecarboxamido)hexanoic acid

A mixture of 13.1 g. of N-carboxyl-1-aminocyclopentane-carboxylic acid anhydride, 11.5 g. of 6-aminohexanoic acid and 250 ml. of pyridine was refluxed for 15 minutes. After cooling, the mixture was filtered, the filtrate was evaporated to dryness, and the residue was washed with water. The product was crystallized twice from absolute ethanol, finally yielding 10.4 g.

Calcd. for $C_{12}H_{22}N_2O_3$: C, 59.5; H, 9.1. Found: C, 59.2; H, 9.3.

At 300 mg. per kg., administered intraperitoneally to mice, the compound gave an antibody index (A.I.) of 0.34, compared with 0.40 for the 6-mercaptopurine standard. At 200 mg. per kg. administered orally to mice, this material gave 83 percent protection in the experimental allergic encephalomyelitis (EAE) test.

EXAMPLE II 6-(L-α-aminohydrocinnamido)hexanoic acid

A mixture of 2 g. of N-carboxy-L-phenylalanine anhydride, 1.37 g. of 6-aminohexanoic acid, and 100 ml. of pyridine was refluxed for 10 minutes. After cooling to room temperature the system was evaporated almost to dryness. The residue was washed successively with water and ethanol and evaporated to dryness. The product was crystallized by dissolving in boiling ethanol, adding ethyl ether to the first cloudiness, and then storing at $-18°$ for 5 days. The product, weighting 1.2 g., gave the following analyses:

Calcd. for $C_{15}H_{22}N_2O_3$: C, 64.7; H, 7.9. Found: C, 64.3; H, 7.5.

We claim:

1. A compound selected from the group consisting of those having the formula:

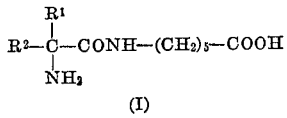

(I)

wherein $R^1$ and $R^2$, when separate, are hydrogen and benzyl, respectively, and, when joined, complete an alicyclic ring which is cyclopentane.

2. A compound in accordance with claim 1, which compound is 6-(1-aminocyclopentanecarboxamido)hexanoic acid.

3. A compound in accordance with claim 1, which compound is 6-(L-α-aminohydrocinnamido)hexanoic acid.

References Cited

UNITED STATES PATENTS 2,215,367  9/1940  Balle et al. _____ 260—519

LORRAINE A. WEINBERGER, Primary Examiner

PAUL J. KILLOS, Assistant Examiner

U.S. Cl. X.R.

260—518; 424—320, 324, 319

PO-1050
(5/69)

UNITED STATES PATENT OFFICE
CERTIFICATE OF CORRECTION

Patent No. 3,487,105      Dated December 30, 1969

Inventor(s) Norman H. Grant, Harvey E. Alburn, Donald E. Clark

It is certified that error appears in the above-identified patent and that said Letters Patent are hereby corrected as shown below:

In column 3, lines 45-47, in the right hand portion of the formula (equation), in the denominator thereof; the "S" outside the closed parenthesis, should read --C--.

SIGNED AND SEALED
FEB 2 1971

(SEAL)
Attest:

Edward M. Fletcher, Jr.
Attesting Officer

WILLIAM E. SCHUYLER, JR.
Commissioner of Patents